(12) United States Patent
Conner et al.

(10) Patent No.: US 9,293,052 B2
(45) Date of Patent: Mar. 22, 2016

(54) SYSTEM AND METHOD FOR MODULATING ALERTS FOR AN INTENDED RUNWAY

(71) Applicant: HONEYWELL INTERNATIONAL INC., Morristown, NJ (US)

(72) Inventors: Kevin J Conner, Kent, WA (US); Yasuo Ishihara, Kirkland, WA (US); Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 169 days.

(21) Appl. No.: 14/060,768

(22) Filed: Oct. 23, 2013

(65) Prior Publication Data
US 2015/0112517 A1 Apr. 23, 2015

(51) Int. Cl.
  *G08G 5/02* (2006.01)
  *G08G 5/00* (2006.01)
  *G05D 1/00* (2006.01)
  *G05D 1/06* (2006.01)

(52) U.S. Cl.
  CPC ............ *G08G 5/0021* (2013.01); *G05D 1/0077* (2013.01); *G05D 1/0676* (2013.01); *G08G 5/025* (2013.01)

(58) Field of Classification Search
  CPC ............ G08G 5/02; G08G 5/00; G08G 5/025
  USPC ............ 701/4, 8, 9, 14, 15, 16; 340/963, 945, 340/951, 972; 348/117
  See application file for complete search history.

(56) References Cited

U.S. PATENT DOCUMENTS

| | | | | |
|---|---|---|---|---|
| 6,606,563 B2 * | 8/2003 | Corcoran, III | .......... | G01S 19/17 340/435 |
| 6,614,397 B2 * | 9/2003 | Pullen | .................. | G08G 5/0082 340/945 |
| 6,871,124 B1 * | 3/2005 | McElreath | .......... | G01C 23/005 340/947 |
| 7,109,889 B2 * | 9/2006 | He | ....................... | G01C 23/005 340/971 |

(Continued)

FOREIGN PATENT DOCUMENTS

| | | |
|---|---|---|
| EP | 2506237 A1 | 10/2012 |
| EP | 2560152 A1 | 2/2013 |

(Continued)

OTHER PUBLICATIONS

MK VI and MK VIII; Enhanced Ground Proximity Warning System (EGPWS) Pilot's Guide, 060-4314-000 Rev. C May 2004; Honeywell International, Inc.

(Continued)

*Primary Examiner* — Thomas G Black
*Assistant Examiner* — Sara Lewandroski
(74) *Attorney, Agent, or Firm* — Ingrassia Fisher & Lorenz, P.C.

(57) ABSTRACT

A system and method provide an alert to a pilot of an aircraft aurally with a given volume and inflection, and/or visually with a text message which includes color, font, and pitch (size). The alert is rendered in distinct fashion for the expected and unexpected cases, e.g., an intended runway and an unintended runway. In a preferred embodiment, the alert for the intended runway is changed to a confirmation level, or one that is less likely to interfere with other information flow, while the alert for the unintended runway would be provided in a more conspicuous manner.

1 Claim, 5 Drawing Sheets

(56) References Cited

U.S. PATENT DOCUMENTS

| | | | |
|---|---|---|---|
| 7,117,089 B2 | 10/2006 | Khatwa et al. | |
| 7,813,845 B2 * | 10/2010 | Doose | G01C 21/26 340/951 |
| 7,963,618 B2 * | 6/2011 | Stone | G08G 5/0008 301/16 |
| 8,145,367 B2 * | 3/2012 | Khatwa | G08G 5/025 701/120 |
| 8,396,616 B1 | 3/2013 | Barber et al. | |
| 8,812,223 B2 * | 8/2014 | Durham | G08G 5/0013 701/120 |
| 2003/0090420 A1 | 5/2003 | Pullen | |
| 2004/0030465 A1 * | 2/2004 | Conner | G01S 19/15 701/16 |
| 2005/0015202 A1 * | 1/2005 | Poe | G08G 5/0008 701/301 |
| 2007/0142982 A1 * | 6/2007 | Lorido | G08G 5/025 701/16 |
| 2007/0250224 A1 * | 10/2007 | Dwyer | G01C 23/005 701/16 |
| 2007/0288129 A1 * | 12/2007 | Komer | G10L 15/26 701/3 |
| 2008/0195301 A1 | 8/2008 | Fabre et al. | |
| 2008/0215198 A1 * | 9/2008 | Richards | G08G 5/0065 701/15 |
| 2009/0231164 A1 * | 9/2009 | Burgin | G08G 5/02 340/971 |
| 2010/0017051 A1 | 1/2010 | Trautenberg | |
| 2011/0106343 A1 * | 5/2011 | Burgin | G08G 5/0013 701/16 |
| 2013/0211636 A1 * | 8/2013 | Martins | B64D 45/00 701/15 |
| 2013/0304283 A1 * | 11/2013 | Puyou | G05D 1/0808 701/14 |

FOREIGN PATENT DOCUMENTS

| | | |
|---|---|---|
| FR | 2895072 A1 | 6/2007 |
| WO | 03077224 A1 | 9/2003 |
| WO | 03107299 A2 | 12/2003 |

OTHER PUBLICATIONS

Extended EP search report for Application No. 14186290.4-1802/2866112 dated Nov. 11, 2015.

* cited by examiner

SYSTEM AND METHOD FOR MODULATING ALERTS FOR AN INTENDED RUNWAY

TECHNICAL FIELD

The exemplary embodiments described herein generally relates to aircraft safety and more particularly to modulating alerts when an intended runway has been identified during an approach into an airport, during taxi, or assuming position for takeoff.

BACKGROUND

The approach and landing is the most difficult phase of a flight due to the precision actions required and increased pilot workload. While flying an instrument approach for example, pilots are trained to monitor progress and make adjustment with reference to a plurality of flight instruments, e.g., the Flight Director (FD), the glide path deviation scale, and the Horizontal Situation Indicator (HSI).

Furthermore, most air traffic control systems around the world utilize voice communications to transmit various messages between air traffic controllers and pilots. These messages include, among other things, flight clearances, various advisories, and weather information, which help ensure coordination of aircraft movement, and appropriate aircraft separation. As air travel has increased over the years, controller-pilot communication has concomitantly increased to the point that the voice communication channels have, at many locations, become saturated during peak aircraft traffic periods.

Additionally, aircraft systems provide various messages to alert the pilot to the aircraft's position during the approach and landing. Currently, some alerting systems, for example, a runway awareness and advisory system, provide alerts that may not be needed and can create unwanted situations in the cockpit where the alerts, in addition to the monitoring of instruments and reception of voice information, begins to interfere with normal cockpit routines, including communication with air traffic control.

Therefore, although the present communication system implementation is generally reliable and safe, it may be cumbersome, time-consuming, and a distraction to the pilot, and other types of mental transformation errors when overburdened with too much information.

Accordingly, it is desirable to provide a system and method for reducing, or modulating, non-essential information provided to a pilot during an approach and landing. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for modulating alerts when an intended runway has been identified during an approach into an airport.

In an exemplary embodiment, a system for modulating an alert provided to a pilot of an aircraft, the aircraft configured to be aligned with an intended runway of a plurality of runways, the system comprising an alert system configured to designate the alert specific for the intended runway, the alert having a first format and a second format; and a processor configured to designate the intended runway; determine a proximity of the aircraft to the intended runway; select the first format when the proximity is within a first threshold of a distance to the runway; and select the second format when the proximity is within a second threshold of a distance to another of the runways.

In another exemplary embodiment, a system for modulating an alert provided to a pilot of an aircraft, the aircraft configured to be aligned with an intended runway of a plurality of runways, the system comprising an alert system designating the alert related to the intended runway; a processor configured to determine a location of the aircraft and its proximity to one of the intended runway or an unintended runway; select a first format of the alert when the proximity of the aircraft is within a first threshold to the intended runway; select a second format of the alert when the proximity of the aircraft is within a second threshold to the unintended runway; and present the alert in the first format when the proximity is within the first threshold to the intended runway and the alert in the second format when the proximity is within the second threshold to the unintended runway.

In yet another exemplary embodiment, a method for modulating an alert provided to a pilot of an aircraft, the aircraft configured to approach an intended runway of a plurality of runways, comprising designating the intended runway; defining an alert for the intended runway; determining a proximity of the aircraft to the intended runway; selecting a first format for the alert when the proximity is within a first threshold of a distance to the intended runway; and selecting a second format for the alert when the proximity is within a second threshold of a distance to an unintended runway of the plurality of runways.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

While the exemplary embodiments described herein refer to displaying the information on aircraft, the invention may also be applied to other vehicle display systems and displays used by off-site controllers, e.g., air traffic control (ATC) and ground controllers for drones.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

In accordance with the exemplary embodiments, selected runway information is used to modulate the alerts. A selected runway may be, for example, one intended for takeoff or landing. Instead of eliminating the alert, the system would change the alerting behavior to be more compatible with the normal cockpit routine when the runway associated with the alert is the selected and therefore the expected runway. The selected runway typically is the runway intended for approach/landing or takeoff, and is selected by providing the runway information by the flight plan or manually by the pilot.

The current system as described by the exemplary embodiments herein may provide the alert in two parts: 1) aurally with a given volume and inflection, and/or 2) visually with a text message which includes color, font, or pitch (size). The alerts are rendered in a first distinct fashion for the expected runway and a second distinct fashion for the unexpected runway. In a preferred embodiment, the alert is not eliminated for a selected runway, but changed to a confirmation level, or one that is less likely to interfere with other information flow.

Parameters are separated into two sets with one for the expected case and another for the unexpected case. For example, if the alert is an advisory for aligning with a runway and provides a callout of "On Runway three four left" at −6 dB with a text message in a large font. For the non-selected runway case, the alert could be −3 dB, i.e., louder, and the text would be in the large font in yellow. For the selected runway case, the alert could be −9 dB, i.e., quieter, and the text could be in a medium font in green (confirming the proper approach, since it is expected).

Figure 1:
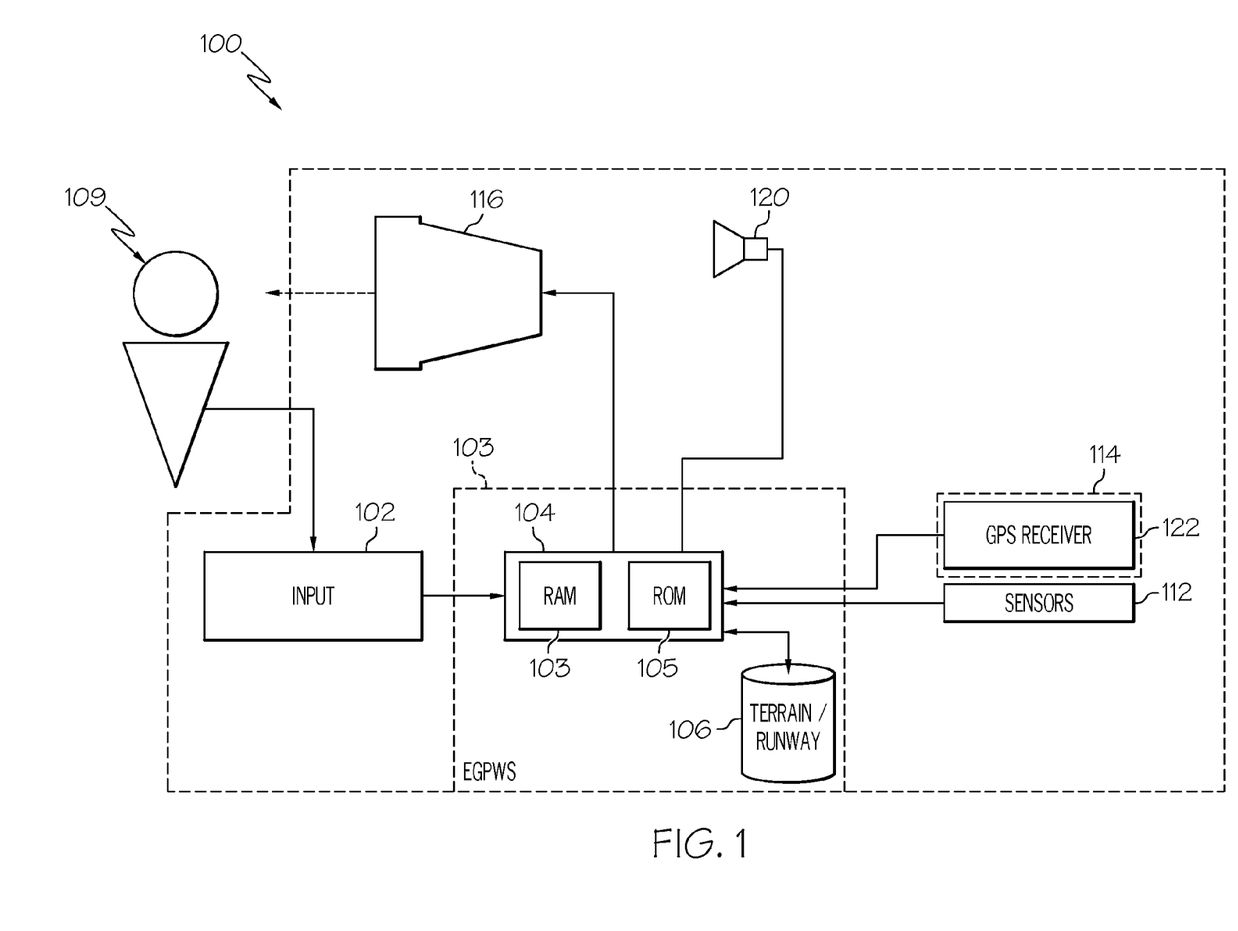
FIG. 1 is a block diagram of a known display system suitable for use in an aircraft in accordance with the exemplary embodiments described herein.

Referring to FIG. 1, an exemplary flight deck system 100 is depicted and will be described for providing alerts to a pilot within an aircraft. The system 100 includes a user interface 102, an enhanced ground proximity warning system 103 (EGPWS) including a processor 104 and one or more runway databases 106, various optional sensors 112, various external data sources 114, a display device 116, and a speaker 120 for providing audio alerts. It is understood that the EGPWS 103 includes software sometimes referred to as a runway awareness and advisory system (RAAS). In some embodiments, the user interface 102 and the display device 116 may be combined in the same device, for example, a touch pad. The user interface 102 is in operable communication with the EGPWS 103 and is configured to receive input from a user 109, e.g., a pilot, and, in response to the user input, supply command signals to the processor 104. The user interface 102 may be any one, or combination, of various known user interface devices including, but not limited to, a cursor control device, such as a mouse, a trackball, or joystick, and/or a keyboard, one or more buttons, switches, or knobs.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 of the EGPWS 103 is specifically implemented, it is in operable communication with the runway databases 106, and the display device 116, and is coupled to receive various types of inertial data from the various sensors 112 and various other avionics-related data from the external data sources 114. The processor 104 is configured, in response to the inertial data and the avionics-related data, to selectively retrieve runway data from one or more of the runway databases 106 and to supply appropriate display commands to the display device 116. The display device 116, in response to the display commands from the processor 104 selectively renders various types of textual, graphic, and/or iconic information. The preferred manner in which the textual, graphic, and/or iconic information are rendered by the display device 116 will be described in more detail further below. Before doing so, however, a brief description of the databases 106, the sensors 112, and the external data sources 114, at least in the depicted embodiment, will be provided.

The terrain/runway databases 106 include various types of data representative of the terrain over which the aircraft is flying and available runways. It will be appreciated that, although the terrain/runway databases 106 are, for clarity and convenience, shown as being stored separate from the processor 104, all or portions of the databases 106 could be loaded into the RAM 103, or integrally formed as part of the processor 104, and/or RAM 103, and/or ROM 105. The terrain/runway databases 106 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a navigation computer. However, for ease of description and illustration, only a global position system (GPS) receiver 122 is depicted in FIG. 1.

The display device 116, as noted above, in response to display commands supplied from the processor 104, selectively renders various textual, graphical, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few.

In operation, the system 100 is also configured to process the current flight status data for the ownship. In this regard, the sources of flight status data generate, measure, and/or provide different types of data related to the operational status of the ownship, the environment in which the ownship is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process data obtained from the sources of flight status data in the manner described in more detail herein.

It should be understood that FIG. 1 is a simplified representation of a display system 100 for purposes of explanation and ease of description, and FIG. 1 is not intended to limit the application or scope of the subject matter in any way. In practice, the display system 100 will include numerous other devices and components for providing additional functions and features, as will be appreciated in the art.

Figure 2:
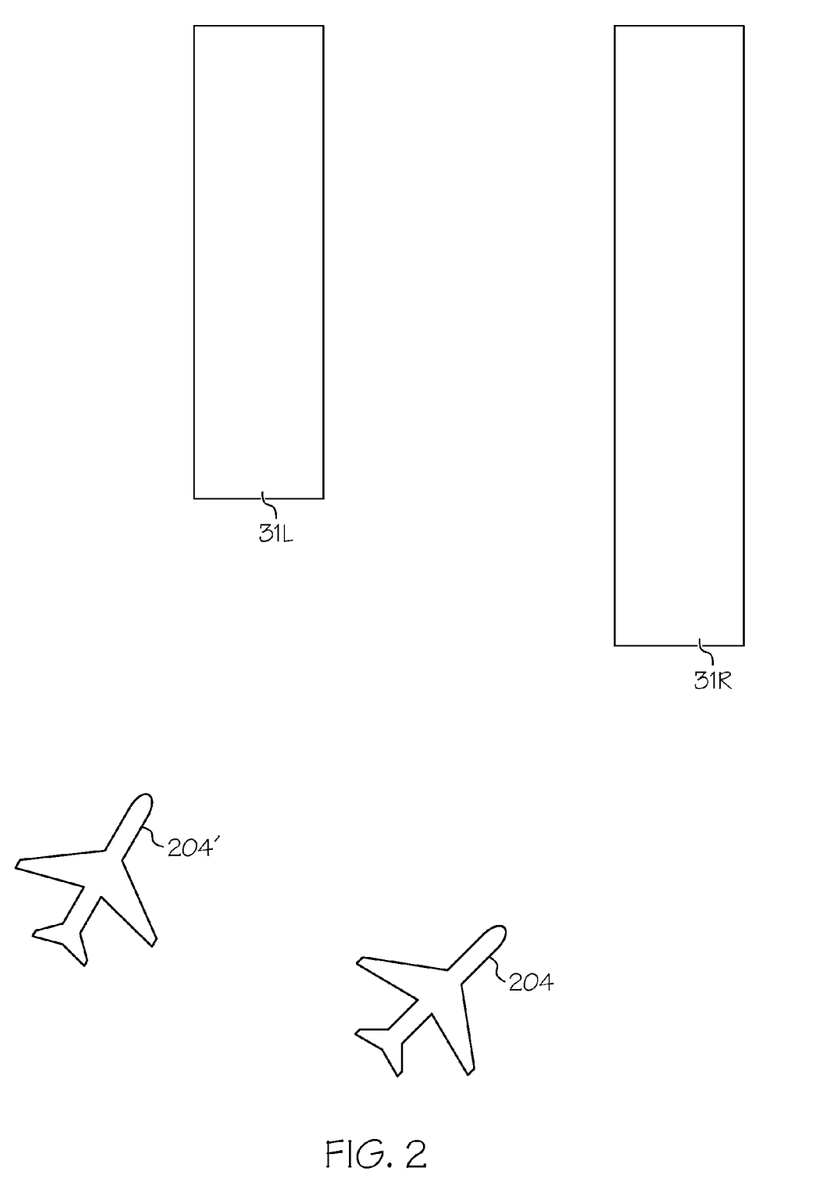
FIG. 2 is an diagram in accordance with a first exemplary embodiment.

Referring to FIG. 2 and in accordance with an exemplary embodiment, a runway 31R is the intended runway for landing and has been designated as such by providing that runway designation to the processor 104. If the ownship 204 approaches the runway 31R in a manner that the processor 104 determines, based on the relationship of the ownship and runway positions, the aircraft 204 is within a threshold for landing on the intended runway 31R, a first alert, for example, an audible alert "approaching runway three one right" is provided by the speaker 120, and/or a visual alert "approaching runway 31R" is displayed on the display 116. In accordance with the exemplary embodiment, in order to minimize any possible interference with other audible signals or duties, the format of the alert is modulated, or modified to a format comprising an audible signal of low magnitude, and/or a color on the display such as green that would not distract from the pilot's duties. The low magnitude and green color will confirm that the aircraft is approaching the intended runway while minimizing any distraction from other duties.

In another exemplary embodiment, if the ownship 204' is approaching an unintended runway 31L (runway 31R has been designated as the intended runway), in a manner that the processor 104 determines the aircraft 204' is within a threshold for landing on the unintended runway 31L, based on the relationship of the ownship and runway positions, a second alert, for example, an audible alert "approaching runway three one left" is provided by the speaker 120, and/or a visual alert "approaching runway 31L" is displayed on the display 116. In accordance with the exemplary embodiment, in order to maximize the alert that the pilot may be approaching the unintended runway regardless of other audible signals or duties, the format of the alert is not modulated, and provided in a format comprising an audible signal of high magnitude, or a color on the display such as red that would maximize the fact to the pilot.

Figure 3:
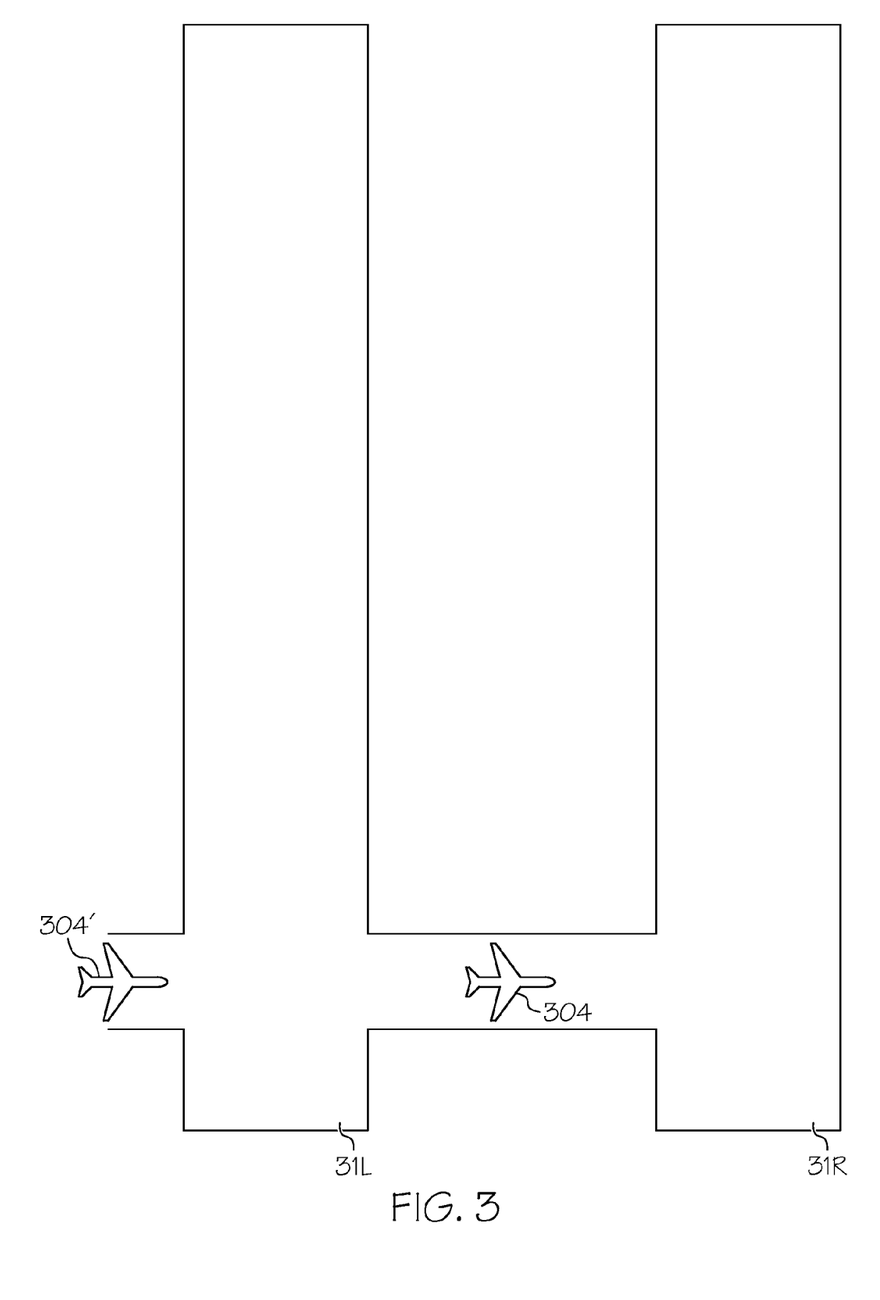
FIG. 3 is a diagram in accordance with a second exemplary embodiment.

In a similar fashion, referring to FIG. 3 and in accordance with an exemplary embodiment, a runway 31R is the intended runway for takeoff and has been designated as such by providing that runway designation to the processor 104. If the ownship 304 approaches the runway 31R in a manner that the processor 104 determines the aircraft 304 is within a proper taxi approach for the intended runway 31R, based on the relationship of the ownship and runway positions, a first alert, for example, an audible alert "approaching runway three one right" is provided by the speaker 120, and/or a visual alert "approaching runway 31R" is displayed on the display 116. In accordance with the exemplary embodiment, in order to minimize any possible interference with other audible signals or duties, the format of the alert is modulated, or modified to a format comprising an audible signal of low magnitude, or a color on the display such as green that would not distract from the pilot's duties. The low magnitude and green color will confirm that the aircraft is approaching the intended runway while minimizing any distraction from other duties.

In another exemplary embodiment, if the ownship 304' is approaching an unintended runway 306 while taxiing, in this case 31L (runway 31R has been designated as the intended runway), in a manner that the processor 104 determines the aircraft 304' is within a taxi approach for the unintended runway 31L, based on the relationship of the ownship and runway positions, a second alert, for example, an audible alert "approaching runway three one left" is provided by the speaker 120, and/or a visual alert "approaching runway 31L" is displayed on the display 116. In accordance with the exemplary embodiment, in order to maximize the alert that the pilot may be approaching the unintended runway regardless of other audible signals or duties, the format of the alert is not modulated, and provided in a format comprising an audible signal of high magnitude, or a color on the display such as red that would call the fact to the pilot.

Figure 4:
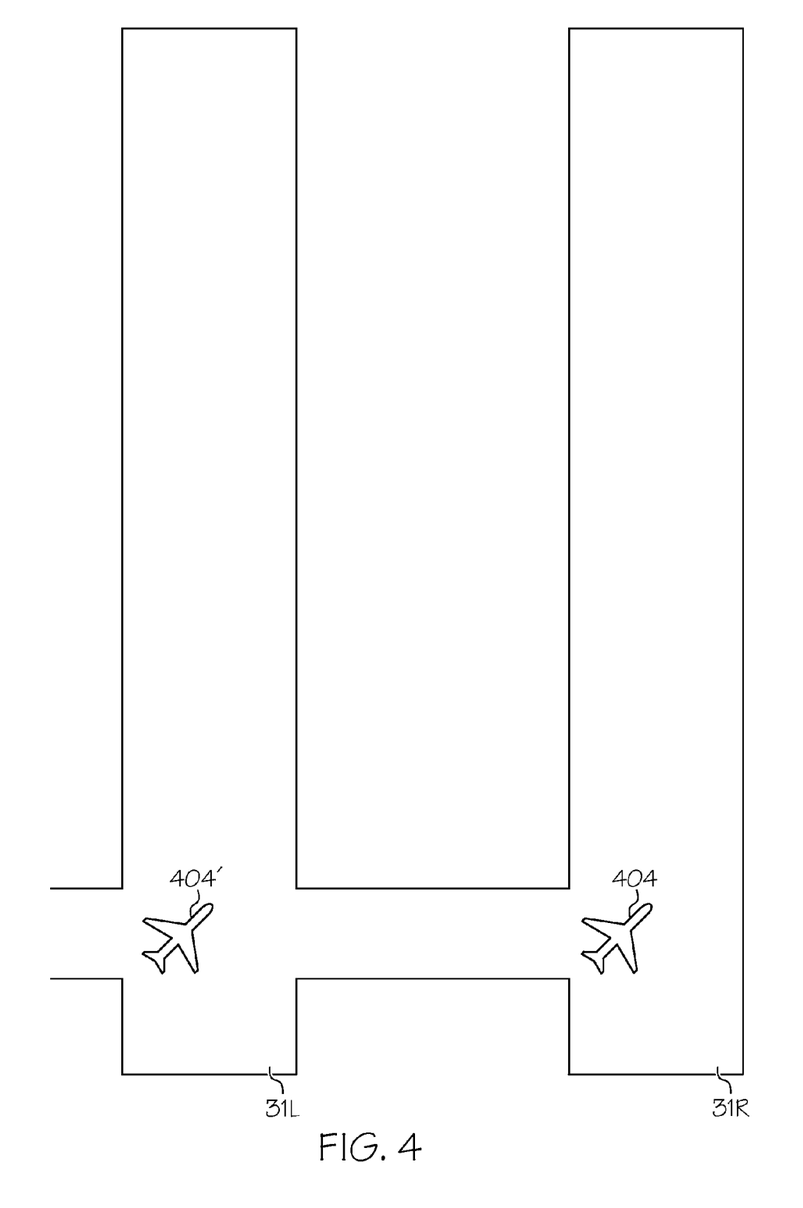
FIG. 4 is is a diagram in accordance with a third exemplary embodiment.

Referring to FIG. 4 and in accordance with an exemplary embodiment, a runway 31R is the intended runway for takeoff and has been designated as such by providing that runway designation to the processor 104. If the ownship 404 "pulls onto" the runway 31R in a manner that the processor 104 determines the aircraft 404 is aligned or is aligning with the intended runway 31R, based on the relationship of the ownship and runway positions, a first alert, for example, an audible alert, for example, "on runway three one right" is provided by the speaker 120, and/or a visual alert "on runway 31R" is displayed on the display 116. In accordance with the exemplary embodiment, in order to minimize any possible interference with other audible signals or duties, the format of the alert is modulated, or modified to a format comprising an audible signal of low magnitude, or a color on the display such as green that would not distract from the pilot's duties. The low magnitude and green color will confirm that the aircraft is approaching the intended runway while minimizing any distraction from other duties.

In another exemplary embodiment, if the ownship 404' is approaching an unintended runway 406 while taxiing, in this case 31L (runway 31R has been designated as the intended runway), in a manner that the processor 104 determines the aircraft 404' is "entering" the unintended runway 31L for takeoff, based on the relationship of the ownship and runway positions, a second alert, for example, an audible alert "on runway three one left" is provided by the speaker 120, and/or a visual alert "on runway 31L" is displayed on the display 116. In accordance with the exemplary embodiment, in order to maximize the alert that the pilot may be entering the unintended runway regardless of other audible signals or duties, the format of the alert is not modulated, and provided in a format comprising an audible signal of high magnitude, or a color on the display such as red that would call the fact to the pilot.

Figure 5:
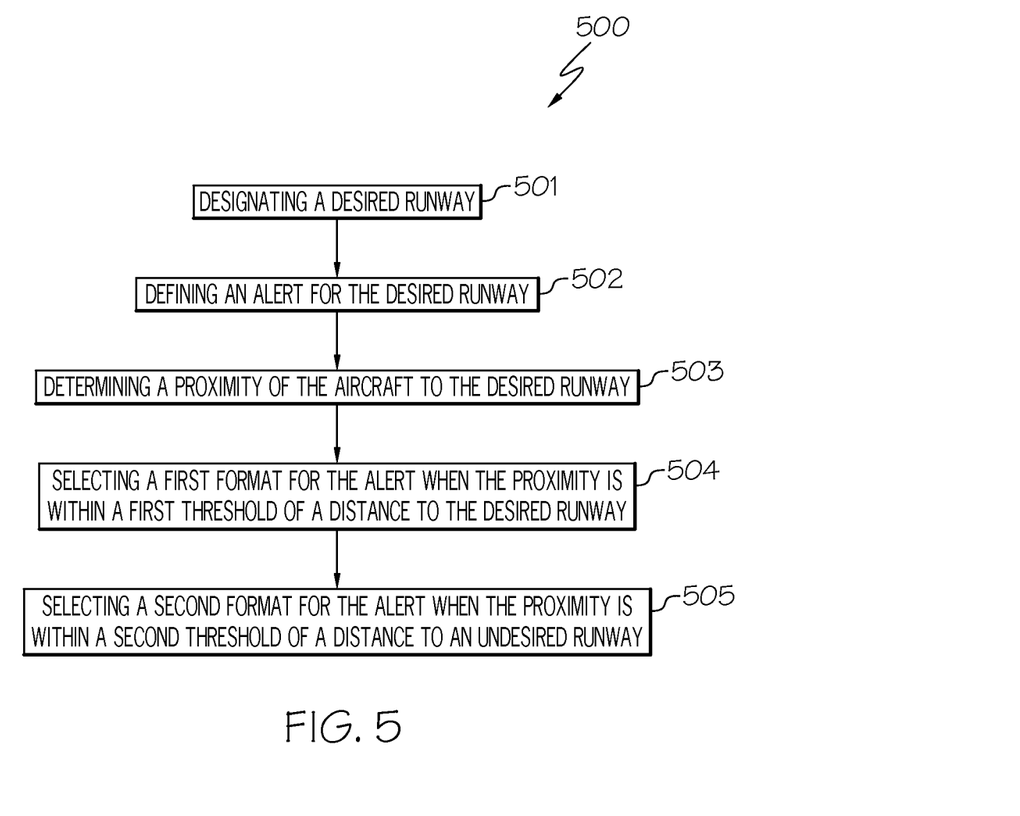
FIG. 5 a flow diagram of an exemplary method suitable for use with the display system of FIG. 1 in accordance with the exemplary embodiments.

FIG. 5 is a flow chart that illustrates an exemplary embodiment of a method 500 suitable for use with a flight deck display system 100. Method 500 represents one implementation of a method for displaying aircraft approaches or departures on an onboard display of a ownship. The various tasks performed in connection with method 500 may be performed by software, hardware, firmware, or any combination thereof. For illustrative purposes, the following description of method 500 may refer to elements mentioned above in connection with preceding FIGS. In practice, portions of method 500 may be performed by different elements of the described system, e.g., a processor, a display element, or a data communication component. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 as long as the intended overall functionality remains intact.

In accordance with the exemplary method of FIG. 5, a method for modulating an alert provided to a pilot of an aircraft, the aircraft being configured to approach an intended runway of a plurality of runways, comprises designating 501 the intended runway; defining 502 an alert for the intended runway; determining 503 a proximity of the aircraft to the intended runway; selecting 504 a first format for the alert when the proximity is within a first threshold of a distance to the intended runway; and selecting 505 a second format for the alert when the proximity is within a second threshold of a distance to an unintended runway of the plurality of runways.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for modulating an alert provided to a pilot of an aircraft, the aircraft configured to be aligned with an intended runway of a plurality of runways, the system comprising:
- an alert system designating the alert related to the intended runway;
- a processor configured to:
  - determine a location of the aircraft and its proximity to one of the intended runway or an unintended runway;
  - select a first format of the alert when the proximity of the aircraft is within a first threshold to the intended runway;
  - select a second format of the alert when the proximity of the aircraft is within a second threshold to the unintended runway; and
  - present the alert in the first format when the proximity is within the first threshold to the intended runway and the alert in the second format when the proximity is within the second threshold to the unintended runway, wherein the first and second formats comprise audio content having a given volume and inflection and wherein the alert comprises an aural alert and the first format comprises a volume less than the volume of the second format.

* * * * *